United States Patent
Li

(10) Patent No.: US 10,007,468 B2
(45) Date of Patent: *Jun. 26, 2018

(54) METHOD AND APPARATUS FOR ERASING DATA IN DATA SECTION IN FLASH MEMORY

(71) Applicant: HUAWEI TECHNOLOGIES CO., LTD., Shenzhen (CN)

(72) Inventor: Yan Li, Chengdu (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/716,360

(22) Filed: Sep. 26, 2017

(65) Prior Publication Data
US 2018/0018126 A1    Jan. 18, 2018

Related U.S. Application Data

(63) Continuation of application No. 14/852,968, filed on Sep. 14, 2015, now Pat. No. 9,823,878, which is a
(Continued)

(51) Int. Cl.
*G06F 12/00* (2006.01)
*G06F 3/06* (2006.01)
(Continued)

(52) U.S. Cl.
CPC .......... *G06F 3/0652* (2013.01); *G06F 3/0619* (2013.01); *G06F 3/0679* (2013.01);
(Continued)

(58) Field of Classification Search
CPC ............. G06F 12/0888; G06F 12/0893; G06F 2212/2022; G06F 2212/2024; G11C 16/0483; G11C 16/12
(Continued)

(56) References Cited

U.S. PATENT DOCUMENTS

| 5,341,338 A | 8/1994 | Wells |
| 5,341,339 A | 8/1994 | Wells |

(Continued)

FOREIGN PATENT DOCUMENTS

| CN | 1767066 A | 5/2006 |
| CN | 1831786 A | 9/2006 |

(Continued)

OTHER PUBLICATIONS

Office Action issued in Chinese Application No. 201380000705.7 dated Mar. 28, 2016; 24 pages.
(Continued)

*Primary Examiner* — Mardochee Chery
(74) *Attorney, Agent, or Firm* — Fish & Richardson P.C.

(57) ABSTRACT

A data erasing method and apparatus applied to a flash memory. The method includes receiving a data erasing instruction, where the data erasing instruction instructs to erase data or at least one data section of data sections corresponding to data, when the data erasing instruction instructs to erase the data, searching for recorded storage addresses of all the data sections corresponding to the data, and erasing all the data sections corresponding to the data according to the storage addresses that are found; and when the data erasing instruction instructs to erase the at least one data section of the data sections corresponding to the data, searching for a recorded storage address of the at least one data section, and erasing the at least one data section according to the storage address that is found.

15 Claims, 5 Drawing Sheets

Related U.S. Application Data continuation of application No. PCT/CN2013/072773, filed on Mar. 15, 2013.

(51) Int. Cl.
*G06F 12/02* (2006.01)
*G06F 21/79* (2013.01)
*G11C 16/04* (2006.01)
*G06F 12/0893* (2016.01)
*G06F 12/0888* (2016.01)

(52) U.S. Cl.
CPC .......... *G06F 12/0246* (2013.01); *G06F 21/79* (2013.01); *G06F 12/0888* (2013.01); *G06F 12/0893* (2013.01); *G06F 2212/1032* (2013.01); *G06F 2212/1052* (2013.01); *G06F 2212/2022* (2013.01); *G06F 2212/2024* (2013.01); *G06F 2212/7201* (2013.01); *G06F 2212/7205* (2013.01); *G06F 2221/2143* (2013.01); *G11C 16/0483* (2013.01)

(58) Field of Classification Search
USPC ........................................................ 711/103
See application file for complete search history.

(56) References Cited

U.S. PATENT DOCUMENTS

| 2006/0077721 | A1 | 4/2006 | Sugio |
| 2006/0090029 | A1 | 4/2006 | Chang |
| 2009/0216945 | A1 | 8/2009 | Shimad |
| 2009/0259808 | A1 | 10/2009 | Koren et al. |
| 2010/0153620 | A1 | 6/2010 | McKean et al. |
| 2010/0293320 | A1 | 11/2010 | Li et al. |

FOREIGN PATENT DOCUMENTS

| CN | 101465164 A | 6/2009 |
| CN | 101673243 A | 3/2010 |
| CN | 101923516 A | 12/2010 |
| CN | 102239480 A | 11/2011 |

OTHER PUBLICATIONS

Office Action issued in Chinese Application No. 201380000705.7 dated May 3, 2017; 30 pages.

Office Action issued in Chinese Application No. 201380000705.7 dated Aug. 29, 2017; 13 pages.

Extended European Search Report issued in European Application No. 13877566.3 dated Feb. 10, 2016; 8 pages.

International Search Report and Written Opinion issued in International Application No. PCT/CN2013/072773 dated Dec. 19, 2013; 21 pages.

Dong Zhang, "Stories storage-Principle and Solution of Network Storage System", Tsinghua University Publishing dated 2008, 8 pages.

Ruiping Qiao: "principles and application of TMS320C54x DSP", Feb. 2005, 11 pages.

METHOD AND APPARATUS FOR ERASING DATA IN DATA SECTION IN FLASH MEMORY

CROSS-REFERENCE TO RELATED APPLICATIONS

This application is a continuation of U.S. patent application Ser. No. 14/852,968, filed on Sep. 14, 2015, which is a continuation application of International Application No. PCT/CN2013/072773, filed on Mar. 15, 2013. Both of the aforementioned applications are hereby incorporated by reference in their entireties.

TECHNICAL FIELD

The present disclosure relates to the field of storage technologies, and in particular, to a data erasing method and apparatus applied to a flash memory.

BACKGROUND

A flash memory is a type of non-volatile memory that has a characteristic of retaining data after a power failure. Therefore, the flash memory is widely used as an external memory.

A storage manner of the flash memory is different from that of a conventional mechanical memory. For example, all or some data of a file is stored in a storage area of the flash memory. When a user re-saves the data, for example, the user modifies the data and directly saves modified data, the flash memory does not write the re-saved data into the original storage area but writes the re-saved data into a new storage area of the flash memory, and the data in the original storage area remains unchanged. In this case, it seems that the data has been overwritten by the data that is re-saved by the user, but actually, even if the user deletes the re-saved data, the data before the re-saving by the user still exists in the flash memory, and persons skilled in the art can still read, by using some technical means or tools, the data that still exists in the flash memory. Therefore, data leakage cannot be prevented.

To implement that data stored in a flash memory is securely erased, that is, to erase all data sections that are stored in the flash memory and are related to the data, including data before re-saving and data after re-saving, two manners are generally provided: one manner is erasing a system entry of the flash memory to achieve a purpose of data destruction; the other manner is performing full-disk erasing on the flash memory, that is, full-disk formatting. However, the two erasing manners have disadvantages. In the first manner, the flash memory cannot be used again; in the second manner, full-disk data loss may be caused, thereby affecting reading and writing of other data, except data that needs to be erased, stored in the flash memory.

SUMMARY

Embodiments of the present disclosure provide a data erasing method and apparatus applied to a flash memory, which can implement secure erasing of data that needs to be erased, without affecting reading and writing of other data, except the data that needs to be erased, stored in the flash memory.

A first aspect of the present disclosure provides a data erasing method applied to a flash memory, where the method includes receiving a data erasing instruction, where the data erasing instruction instructs to erase data or at least one data section of data sections corresponding to data, and erasing, according to the data erasing instruction, a data section that needs to be erased and that is among the data sections corresponding to the data, where when the data erasing instruction instructs to erase the data, recorded storage addresses of all the data sections corresponding to the data are searched for and all the data sections corresponding to the data are erased according to the storage addresses that are found, or when the data erasing instruction instructs to erase the at least one data section of the data sections corresponding to the data, a recorded storage address of the at least one data section is searched for and the at least one data section is erased according to the storage address that is found.

In a first possible implementation manner of the first aspect, the recorded storage address of the data section includes a logical block address (LBA) and a data block number (BN), and the erasing a data section that needs to be erased and that is among the data sections corresponding to the data includes determining, according to a BN in a storage address of the data section that needs to be erased, a data block in which the data section that needs to be erased is stored, and determining, according to an LBA in the storage address of the data section that needs to be erased, a page in which the data section that needs to be erased is stored, and searching for and erasing, according to the determined data block and page, the data section that needs to be erased.

With reference to the first aspect or the first possible implementation manner of the first aspect, in a second possible implementation manner of the first aspect the data corresponds to at least two data sections, and in this case, before the receiving a data erasing instruction, the method further includes writing the at least two data sections corresponding to the data, and recording a storage address of each written data section.

With reference to the second possible implementation manner of the first aspect, in a third possible implementation manner of the first aspect a map table and a trace log are set in the flash memory, in this case, the writing the at least two data sections corresponding to the data, and recording a storage address of each written data section includes successively writing the at least two data sections corresponding to the data, recording, in the map table, a storage address of a latest data section that corresponds to the data and that is last written, and recording, in the trace log, a storage address of a historical data section that is written before the latest data section, and that when the data erasing instruction instructs to erase the data, recorded storage addresses of all the data sections corresponding to the data are searched for and all the data sections corresponding to the data are erased according to the storage addresses that are found includes when the data erasing instruction instructs to erase the data, searching for the storage address, of the latest data section, recorded in the map table, and erasing the latest data section according to the storage address that is found; and searching for the storage address, of the historical data section, recorded in the trace log, and erasing the historical data section according to the storage address that is found, or when the data erasing instruction instructs to erase the at least one data section of the data sections corresponding to the data, if the data section that is instructed to be erased includes the latest data section, searching for the storage address, of the latest data section, recorded in the map table, and erasing the latest data section according to the storage address that is found; and if the data section that is instructed to be erased includes the historical data section, searching for the storage address, of the historical data section, recorded in the trace log, and erasing the historical data section according to the storage address that is found.

With reference to the third possible implementation manner of the first aspect, in a fourth possible implementation manner of the first aspect the at least two data sections that are successively written include the latest data section and a second-latest data section written before the latest data section, and in this case, the successively writing the at least two data sections corresponding to the data, recording, in the map table, a storage address of a latest data section that corresponds to the data and that is last written, and recording, in the trace log, a storage address of a historical data section that is written before the latest data section includes writing the second-latest data section, and recording a storage address of the second-latest data section in the map table, and writing the latest data section, transferring the storage address, of the second-latest data section, recorded in the map table to the trace log, and recording the storage address of the latest data section in the map table.

With reference to the third possible implementation manner of the first aspect or the fourth possible implementation manner of the first aspect, in a fifth possible implementation manner of the first aspect, the method further includes determining whether free storage space of the trace log is less than a storage space threshold, and when the free storage space of the trace log is less than the storage space threshold, reclaiming storage space of the historical data section in a forced manner according to the storage address, of the historical data section, recorded in the trace log, and releasing storage space in which the storage address of the reclaimed historical data section is recorded in the trace log.

With reference to the first aspect or any implementation manner of the foregoing possible implementation manners of the first aspect, in a sixth possible implementation manner of the first aspect, after all the data sections corresponding to the data are erased or the at least one data section is erased, the method further includes erasing the recorded storage address of the erased data section.

With reference to the first aspect or any implementation manner of the foregoing possible implementation manners of the first aspect, in a seventh possible implementation manner of the first aspect, the erasing a data section that needs to be erased and that is among the data sections corresponding to the data includes re-writing the data section that needs to be erased, and erasing a re-written data section.

With reference to the first aspect or any implementation manner of the foregoing possible implementation manners of the first aspect, in an eighth possible implementation manner of the first aspect, the method further includes erasing a data section corresponding to junk data stored in the flash memory to acquire blank storage space, and erasing a historically recorded storage address of the data section corresponding to the junk data.

A second aspect of the present disclosure provides a data erasing apparatus applied to a flash memory, where the apparatus includes a receiving unit configured to receive a data erasing instruction, where the data erasing instruction instructs to erase data or at least one data section of data sections corresponding to data, and an erasing unit configured to erase, according to the data erasing instruction received by the receiving unit, a data section that needs to be erased and that is among the data sections corresponding to the data, where when the data erasing instruction instructs to erase the data, recorded storage addresses of all the data sections corresponding to the data are searched for and all the data sections corresponding to the data are erased according to the storage addresses that are found, or when the data erasing instruction instructs to erase the at least one data section of the data sections corresponding to the data, a recorded storage address of the at least one data section is searched for and the at least one data section is erased according to the storage address that is found.

In a first possible implementation manner of the second aspect, the recorded storage address of the data section includes a LBA and a data BN, and the erasing unit is configured to determine, according to a BN in a storage address of the data section that needs to be erased, a data block in which the data section that needs to be erased is stored, and determine, according to an LBA in the storage address of the data section that needs to be erased, a page in which the data section that needs to be erased is stored, and search for and erase, according to the determined data block and page, the data section that needs to be erased.

With reference to the second aspect or the first possible implementation manner of the second aspect, in a second possible implementation manner of the second aspect the data corresponds to at least two data sections, and the apparatus further includes a writing unit configured to write the at least two data sections corresponding to the data, and record a storage address of each written data section.

With reference to the second possible implementation manner of the second aspect, in a third possible implementation manner of the second aspect a map table and a trace log are set in the flash memory, in this case, the writing unit is configured to successively write the at least two data sections corresponding to the data, record, in the map table, a storage address of a latest data section that corresponds to the data and that is last written, and record, in the trace log, a storage address of a historical data section that is written before the latest data section, and the erasing unit is configured to when the data erasing instruction instructs to erase the data, search for the storage address, of the latest data section, recorded in the map table, and erase the latest data section according to the storage address that is found; and search for the storage address, of the historical data section, recorded in the trace log, and erase the historical data section according to the storage address that is found.

With reference to the third possible implementation manner of the second aspect, in a fourth possible implementation manner of the second aspect the at least two data sections that are successively written by the writing unit include the latest data section and a second-latest data section written before the latest data section, and in this case, the writing unit is configured to write the second-latest data section, and record a storage address of the second-latest data section in the map table, and write the latest data section, transfer the storage address, of the second-latest data section, recorded in the map table to the trace log, and record the storage address of the latest data section in the map table.

With reference to the third possible implementation manner of the second aspect or the fourth possible implementation manner of the second aspect, in a fifth possible implementation manner of the second aspect, the apparatus further includes a determining unit configured to determine whether free storage space of the trace log is less than a storage space threshold, and the erasing unit is further configured to: when the free storage space of the trace log is less than the storage space threshold, reclaim storage space of the historical data section in a forced manner according to the storage address, of the historical data section, recorded in the trace log, and release storage space in which the storage address of the reclaimed historical data section is recorded in the trace log.

With reference to the second aspect or any implementation manner of the foregoing possible implementation manners of the second aspect, in a sixth possible implementation manner of the second aspect, the erasing unit is further configured to erase the recorded storage address of the erased data section.

With reference to the second aspect or any implementation manner of the foregoing possible implementation manners of the second aspect, in a seventh possible implementation manner of the second aspect, the erasing unit is configured to re-write the data section that needs to be erased, and erase a re-written data section.

With reference to the second aspect or any implementation manner of the foregoing possible implementation manners of the second aspect, in an eighth possible implementation manner of the second aspect, the erasing unit is further configured to: erase a data section corresponding to junk data stored in the flash memory to acquire blank storage space; and erase a historically recorded storage address of the data section corresponding to the junk data.

A third aspect of the present disclosure provides another data erasing apparatus applied to a flash memory, where the apparatus includes a processor, a memory, a communications interface, and a bus, where the processor, the memory, and the communications interface are connected to and communicate with each other by using the bus, the memory is configured to store executable program code, the processor runs, by reading the executable program code stored in the memory, a program corresponding to the executable program code, so as to receive a data erasing instruction, where the data erasing instruction instructs to erase data or at least one data section of data sections corresponding to data, and erase, according to the data erasing instruction, a data section that needs to be erased and that is among the data sections corresponding to the data, where when the data erasing instruction instructs to erase the data, recorded storage addresses of all the data sections corresponding to the data are searched for and all the data sections corresponding to the data are erased according to the storage addresses that are found, or when the data erasing instruction instructs to erase the at least one data section of the data sections corresponding to the data, a recorded storage address of the at least one data section is searched for and the at least one data section is erased according to the storage address that is found.

In a first possible implementation manner of the third aspect, a storage address, of each data section, recorded by the processor includes a LBA and a data BN, and the processor is configured to determine, according to a BN in a storage address of the data section that needs to be erased, a data block in which the data section that needs to be erased is stored, and determine, according to an LBA in the storage address of the data section that needs to be erased, a page in which the data section that needs to be erased is stored, and search for and erase, according to the determined data block and page, the data section that needs to be erased.

With reference to the third aspect or the first possible implementation manner of the third aspect, in a second possible implementation manner of the third aspect the data corresponds to at least two data sections, and in this case, the processor is configured to write the at least two data sections corresponding to the data, and record a storage address of each written data section.

With reference to the second possible implementation manner of the third aspect, in a third possible implementation manner of the third aspect a map table and a trace log are set in the flash memory, in this case, the processor is configured to successively write the at least two data sections corresponding to the data, record, in the map table, a storage address of a latest data section that corresponds to the data and that is last written, and record, in the trace log, a storage address of a historical data section that is written before the latest data section, and when the data erasing instruction instructs to erase the data, search for the storage address, of the latest data section, recorded in the map table, and erase the latest data section according to the storage address that is found; and search for the storage address, of the historical data section, recorded in the trace log, and erase the historical data section according to the storage address that is found.

With reference to the third possible implementation manner of the third aspect, in a fourth possible implementation manner of the third aspect the at least two data sections that are successively written by the processor include the latest data section and a second-latest data section written before the latest data section, and in this case, the processor is configured to write the second-latest data section, and record a storage address of the second-latest data section in the map table, and write the latest data section, transfer the storage address, of the second-latest data section, recorded in the map table to the trace log, and record the storage address of the latest data section in the map table.

With reference to the third possible implementation manner of the third aspect or the fourth possible implementation manner of the third aspect, in a fifth possible implementation manner of the third aspect, the processor is further configured to determine whether free storage space of the trace log is less than a storage space threshold, and when the free storage space of the trace log is less than the storage space threshold, reclaim storage space of the historical data section in a forced manner according to the storage address, of the historical data section, recorded in the trace log, and release storage space in which the storage address of the reclaimed historical data section is recorded in the trace log.

With reference to the third aspect or any implementation manner of the foregoing possible implementation manners of the third aspect, in a sixth possible implementation manner of the third aspect, the processor is further configured to erase the recorded storage address of the erased data section.

With reference to the third aspect or any implementation manner of the foregoing possible implementation manners of the third aspect, in a seventh possible implementation manner of the third aspect, the processor is configured to re-write the data section that needs to be erased, and erase a re-written data section.

With reference to the third aspect or any implementation manner of the foregoing possible implementation manners of the third aspect, in an eighth possible implementation manner of the third aspect, the processor is further configured to erase a data section corresponding to junk data stored in the flash memory to acquire blank storage space; and erase a historically recorded storage address of the data section corresponding to the junk data.

A fourth aspect of the present disclosure provides a flash memory, where a data erasing apparatus is disposed in the flash memory, and the data erasing apparatus is the data erasing apparatus provided in the second aspect or any implementation manner of the foregoing possible implementation manners of the second aspect of the present disclosure or the data erasing apparatus provided in the third aspect or any implementation manner of the foregoing possible implementation manners of the third aspect.

In a first possible implementation manner of the fourth aspect, the flash memory includes any one of the following a solid state drive, a smart media (SM) card, a compact flash (CF) card, an multimedia card (MMC), a secure digital (SD) memory card, a memory stick, an XD-picture card, and a microdrive.

According to the data erasing method applied to a flash memory, the data erasing apparatus, and the flash memory that are provided in the embodiments of the present disclosure, when erasing is performed on data after a data erasing instruction is received, a recorded storage address is searched for according to the data erasing instruction, and a data section that needs to be erased and that is among data sections corresponding to the data is erased. In this way, each written data section can be found according to a storage address of the data section, and therefore all the data sections corresponding to the data can be completely erased, thereby implementing secure erasing of the data. In addition, one or several specified data sections can be erased according to a user requirement, without affecting reading and writing of other data, except the data that needs to be erased.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

To enable persons skilled in the art to better understand the technical solutions of the present disclosure, a storage structure of a flash memory related to the present disclosure is briefly introduced first.

A flash memory generally includes an internal register and a memory matrix, where the memory matrix includes blocks, each block further includes pages, and each page further includes bytes. For example, 4224 bytes may form one page, 128 pages form one block, and 8192 blocks form an entire flash memory.

Generally, the flash memory reads and writes data by page, that is, the flash memory reads and writes data one page by one page, which also means that one page of data needs to be read at a time and one page of data needs to be written at a time.

The following describes in detail a data erasing method and apparatus that are applied to a flash memory and that are provided in the embodiments of the present disclosure.

It should be noted that, in the embodiments of the present disclosure, "erase" and "delete" are similar in concept.

An embodiment of the present disclosure provides a data erasing method that is executed by a flash memory and is executed by a data erasing apparatus disposed in the flash memory, where the flash memory is connected to a computer host, and a user performs, by using the host, an operation on data stored in the flash memory.

Figure 1:
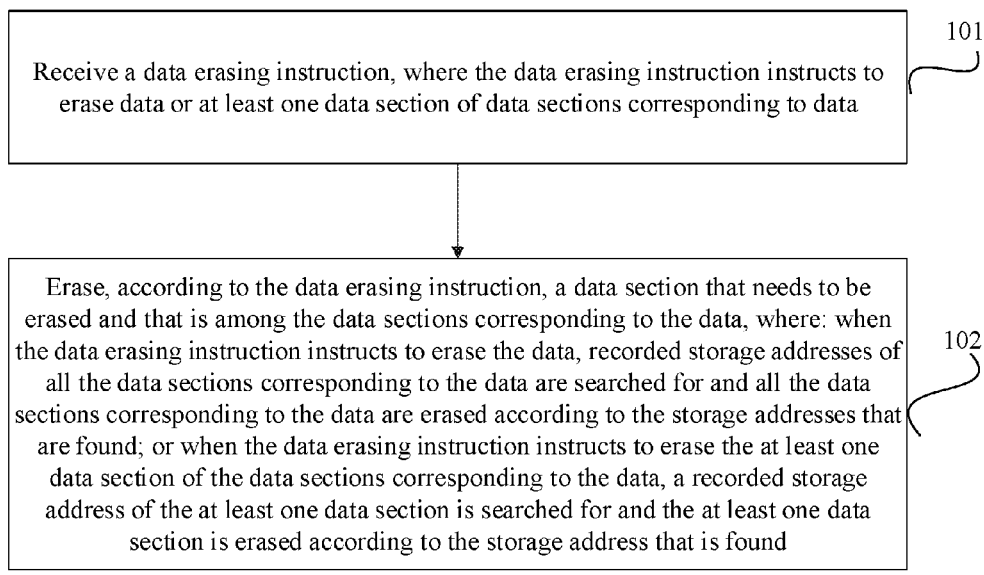
FIG. 1 is a schematic flowchart of a data erasing method according to an embodiment of the present disclosure.

As shown in FIG. 1, an embodiment of the present disclosure provides a data erasing method applied to a flash memory, including the following steps 101: Receive a data erasing instruction, where the data erasing instruction instructs to erase data or at least one data section of data sections corresponding to data.

Preferably, it may be that the data erasing instruction is received by a data erasing apparatus from a host. The data erasing instruction sent by the host may instruct the data erasing apparatus to erase the data or the at least one data section of the data sections corresponding to the data.

In the embodiment of the present disclosure, each piece of data is stored in the flash memory, and in the flash memory, each piece of data actually corresponds to at least one data section. In the embodiment of the present disclosure, that "each piece of data corresponds to at least one data section" indicates that, when a piece of data is initially stored in the flash memory and is not re-saved, the piece of data corresponds to only one data section, that is, original data of the piece of data. It may be known from the foregoing description in Background that, when the piece of data is re-saved once, for example, a user modifies the original data of the piece of data and performs direct saving, the flash memory retains the original data and meanwhile stores a piece of modified data. In this case, the piece of data corresponds to two data sections: one is the original data that is initially stored and the other is the modified data re-saved this time. By analogy, one data section corresponding to the piece of data is added each time re-saving is performed. That is, in the embodiment of the present disclosure, data sections corresponding to each piece of data include original data of the piece of data and data re-saved each time.

It should be noted that, in the embodiment of the present disclosure, "re-saving" means saving again but not saving as. The re-saving indicates that the user intends to overwrite a previous file with data saved this time. That is, after the re-saving is performed, an original file before the re-saving is replaced with a re-saved file and is invisible to the user.

In the embodiment of the present disclosure, when erasing is performed on the piece of data, the user delivers a data erasing instruction to the flash memory by using the host, where the data erasing instruction may instruct to erase the piece of data, that is, to erase all data sections corresponding to the piece of data, or may instruct to erase one or several data sections of data sections corresponding to the piece of data.

102: Erase, according to the data erasing instruction, a data section that needs to be erased and that is among the data sections corresponding to the data.

Optionally, when the data erasing instruction instructs to erase the data, recorded storage addresses of all the data sections corresponding to the data are searched for and all the data sections corresponding to the data are erased according to the storage addresses that are found.

Optionally, when the data erasing instruction instructs to erase the at least one data section of the data sections corresponding to the data, a recorded storage address of the at least one data section is searched for and the at least one data section is erased according to the storage address that is found.

In the embodiment of the present disclosure, when data is stored in the flash memory, that is, when the data is written, a storage address of each data section corresponding to the data is recorded. For example, a storage address, of each data section, recorded by the flash memory may include a LBA and a BN. It should be noted that herein the recorded LBA may also be recorded as a logical block number (LBN), and the LBA and the LBN have a same meaning and are both logical addresses, only differing in a size of represented storage space. There is a correspondence between the LBA and a physical block address (PBA), where the PBA is used to record a physical location of data in the flash memory, that is, in which page the data is recorded. In a case in which an LBA is known, a PBA corresponding to the LBA can be known, so that data is found by using the PBA.

If a recorded storage address includes an LBA and a BN, the flash memory determines, according to the BN, a data block of the data section that needs to be erased in the flash memory, and determines, according to the LBA, According to a mapping relationship between the LBA and a PBA, a page in which the data section that needs to be erased is located in, so as to find and erase the data section that needs to be erased.

Therefore, in this step, if the data erasing instruction instructs to erase the piece of data, all the data sections corresponding to the piece of data are found according to storage addresses recorded when the piece of data is written, and data erasing is performed, that is, all the data sections corresponding to the piece of data can be completely erased, thereby implementing secure erasing of the data. In addition, if the data erasing instruction instructs to erase the at least one data section of the data sections corresponding to the data, a storage address of the at least one data section may be found, and then the at least one data section is found and erased, without affecting reading and writing of other data stored in the flash memory.

According to the data erasing method applied to a flash memory provided in the embodiment of the present disclosure, when erasing is performed on data after a data erasing instruction is received, a recorded storage address is searched for according to the data erasing instruction, and a data section that needs to be erased and that is among data sections corresponding to the data is erased. In this way, each written data section can be found according to a storage address of the data section, and therefore all the data sections corresponding to the data can be completely erased, thereby implementing secure erasing of the data. In addition, one or several specified data sections can be erased according to a user requirement, without affecting reading and writing of other data except the data that needs to be erased.

Figure 2:
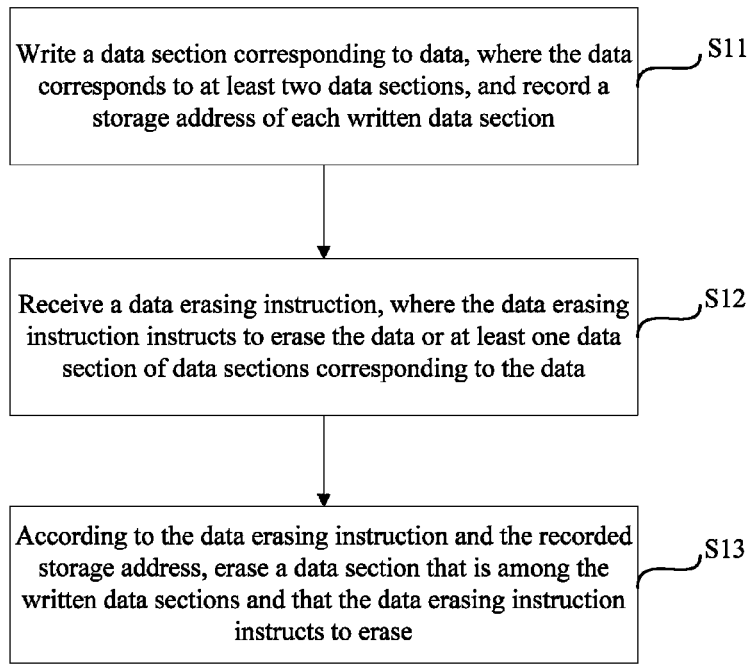
FIG. 2 is another schematic flowchart of a data erasing method according to an embodiment of the present disclosure.

As shown in FIG. 2, a data erasing method provided in an embodiment of the present disclosure includes the following steps S11: Write data sections corresponding to data, and record a storage address of each written data section.

In this step, each piece of data corresponds to at least two data sections, that is, in this step, the written data sections include at least two data sections.

It should be noted that, in the embodiment of the present disclosure, that each piece of data corresponds to at least one data section indicates that, when a piece of data is initially stored in the flash memory and is not re-saved, the piece of data corresponds to only one data section, that is, original data of the piece of data. It may be known from the foregoing description in Background that, when the piece of data is re-saved once, for example, a user modifies the original data of the piece of data and performs direct saving, the flash memory retains the original data and meanwhile stores a piece of modified data. In this case, the piece of data corresponds to two data sections: one is the original data that is initially stored and the other is the modified data re-saved this time. By analogy, one data section corresponding to the piece of data is added each time re-saving is performed. That is, in the embodiment of the present disclosure, data sections corresponding to each piece of data include original data of the piece of data and data re-saved each time.

It should be noted that, in the embodiment of the present disclosure, "re-saving" means saving again but not saving as. The re-saving indicates that the user intends to overwrite a previous file with data saved this time. That is, after the re-saving is performed, an original file before the re-saving is replaced with a re-saved file and is invisible to the user.

Therefore, in this step, writing data sections corresponding to each piece of data is actually writing original data of the piece of data, and then successively writing, according to a time sequence of re-saving, data obtained each time the piece of data is re-saved. Certainly, if the piece of data has never been re-saved, only the original data of the piece of data is written in this step.

It should be noted that a process of writing each data section is similar to that, and details are not described herein.

Different from the, in this step, each time a data section is written, a storage address of the data section in the flash memory is recorded, so that any written data section corresponding to each piece of data can be found by using a recorded storage address. Therefore, when erasing is performed on data sections corresponding to one piece of data, each data section corresponding to the piece of data can be found by using a recorded storage address, and all the data sections corresponding to the piece of data can be completely erased, thereby implementing secure erasing of the data. In addition, one or several data sections of the piece of data can be erased according to a user requirement, without affecting reading and writing of other data stored in the flash memory.

in this step, the storage address of each data section recorded by the flash memory may include a LBA and a data BN. It should be noted that herein the recorded LBA may also be recorded as an LBN, and the LBA and the LBN have a same meaning and are both logical addresses, only differing in a size of represented storage space.

There is a correspondence between the LBA and a PBA, where the PBA is used to record a physical location of data in the flash memory, that is, in which page the data is recorded. In a case in which an LBA is known, a PBA corresponding to the LBA can be known, so that data is found by using the PBA.

For example, assuming that data sections corresponding to data A are written in this step, a format for recording a storage address of the data A may be: (logical block address, data block number). With reference to FIG. 2, in this step, firstly, the user delivers, to a host, an instruction of storing the data A in the flash memory; the host sends original data of the data A to the flash memory and delivers a write command to the flash memory; and the flash memory writes the original data n corresponding to the data A and records a storage address of the data section n as (LBAn, BlockN), where n represents the original data section corresponding to the data A. Next, the user modifies the original data section n that is stored in the flash memory and performs re-saving, where data obtained after the user modifies n and performs the re-saving is referred to as n' herein. According to a storage principle of the flash memory, on a premise that n remains unchanged, the flash memory writes n' into a storage area different from that of n, and records a storage address of the updated data section n' as (LBAn', BlockM), where n' represents a latest data section corresponding to the data A. It can be understood that n still exists in the flash memory, but for the user, the data n has been replaced with n'. Then, the user modifies the data n' that is stored in the flash memory and performs re-saving, where data obtained after the user modifies n' and performs the re-saving is referred to as n" herein. A storage address of the data section n" is recorded as (LBAn", BlockA); in this case, n" replaces n' and becomes the latest data section corresponding to the data A. In this case, it can be understood that n' still exists in the flash memory, but for the user, the data n' has been replaced with n". It should be noted that LBAn, LBAn', and LBAn" are used herein to represent recorded logical block addresses corresponding to the three data sections n, n', and n" respectively, but LBAn, LBAn', and LBAn" actually have a same value.

That is, the data A corresponds to three data sections, n, n', and n". In this step, the three data sections corresponding to the data A are written successively and the storage addresses corresponding to the three data sections are recorded separately, where: n" is last written, that is, written at a latest time, and may be referred to as the latest data section corresponding to the data A; data n and data n' are written before n" and may be referred to as historical data sections corresponding to the data A. Certainly, regardless of a quantity of data sections corresponding to each piece of data, a data section that is last written, that is, written at a latest time, is a latest data section corresponding to the piece of data, and a data section written before the latest data section is a historical data section. For the user, the historical data section is invisible, that is, the historical data section has been replaced with the latest data section; however, the historical data section still exists in the flash memory.

It can be understood that the manner of recording a storage address in the foregoing example is merely exemplary, but is not intended to limit the present disclosure, and persons skilled in the art may choose multiple manners of recording a storage address. In addition, for ease of understanding, in the example, each data section of the data A is only written into one page of one block. However, it can be understood that each data section of the data A can actually be written into multiple pages or even into multiple pages of multiple blocks; in this case, when a storage address is recorded, multiple addresses may be recorded for each data section in a sequence according to a data section writing situation.

It should be noted that storage space used to record the storage address of each written data section may be allocated from storage space of the flash memory or may be allocated from an external non-volatile medium connected to the flash memory, which is not limited by the present disclosure.

S12: Receive a data erasing instruction, where the data erasing instruction instructs to erase the data or at least one data section of the data sections corresponding to the data.

In this step, when the user needs to erase a piece of data on the flash memory, the user sends a data erasing instruction to the flash memory by using the host, so that the flash memory erases the piece of data. The data erasing instruction sent to the flash memory by the host may instruct to erase a piece of data or may instruct to erase one or several data sections of data sections corresponding to data. In the embodiment of the present disclosure, when the data erasing instruction sent to the flash memory by the host instructs to erase the piece of data, it indicates that all data sections corresponding to the data need to be erased, and in the embodiment of the present disclosure, this type of data erasing instruction that instructs to erase all the data sections corresponding to the data is referred to as a secure data erasing instruction.

The user sends the data erasing instruction to the flash memory by using the host. For example, a secure data erasing instruction delivered by using the host may include an LBA and a data length, where the data length is a data length corresponding to a latest data section, so that the flash memory determines, according to the LBA and the data length, that data sections that the host instructs to erase are all data sections of the piece of data. If the data erasing instruction is an erasing instruction (which may be referred to as a non-secure erasing indication in this case) that instructs to erase one or several data sections of the data sections corresponding to the data, a non-secure data erasing instruction delivered by using the host may include an LBA, a data length, and a data section identifier, where the data length is a length of a data section that needs to be erased, and the host indicates, by using the data section identifier, a data section that the host instructs to erase. Alternatively, it may be determined, according to the LBA and the data length, that data sections that the host instructs to erase are data sections of multiple pieces of data (for example, more than 2); in this case, each data section of each piece of data is erased separately. Certainly, the foregoing secure data erasing instruction is merely exemplary, and persons skilled in the art can still make a selection or modification.

S13: According to the data erasing instruction and the recorded storage address, erase a data section that needs to be erased and that is among the written data sections.

If the data erasing instruction received in step S12 is a secure data erasing instruction, in this step, the flash memory finds, according to the recorded storage addresses, all the data sections corresponding to the data, and erases all the data sections, thereby implementing secure erasing of the data. The flash memory may first read a recorded storage address of a latest data section corresponding to the data and erase the latest data section according to the read storage address; then the flash memory reads, according to an inverse sequence of writing time, a recorded storage address of a historical data section corresponding to the data, and erases, according to the read storage address, the historical data section corresponding to the data. In this way, both the latest data section and the historical data section of the data in the flash memory are completely erased, thereby ensuring that the data is not leaked and improving data security.

It should be noted that, if the data erasing instruction instructs to erase one or several data sections of the data sections corresponding to the data, the flash memory reads storage addresses of these data sections recorded by the flash memory, so as to find these data sections and erase these data sections.

Figure 3:
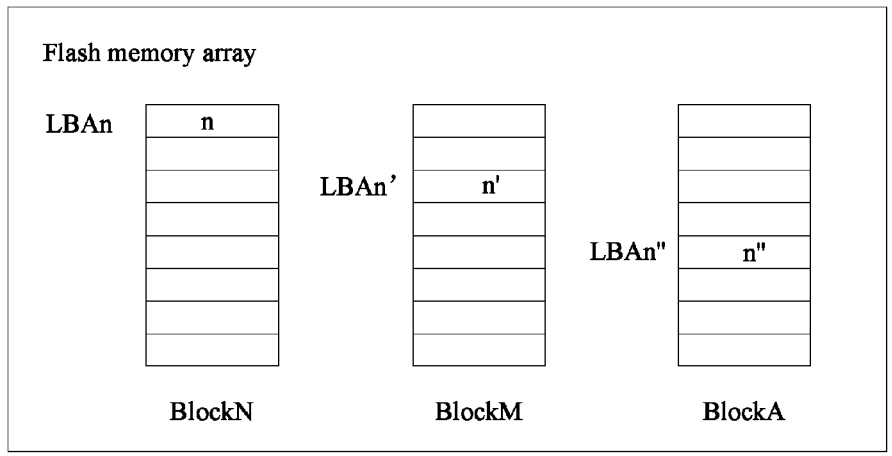
FIG. 3 is an exemplary schematic diagram of a data erasing method according to an embodiment of the present disclosure.

Similarly, in the example shown in step S11, with reference to FIG. 3, if the data erasing instruction received in step S12 instructs to erase the data A, in this step, the flash memory first reads the storage address, recorded by the flash memory, of the latest data section n" of the data A, finds n" according to the read storage address, and erases n"; then, the flash memory reads the storage address of the historical data section n' according to the writing time of the data sections, finds n' according to the read storage address, and erases n'; next, the flash memory reads the storage address of the historical data section n, finds n according to the read storage address, and erases n. So far, all the data sections corresponding to the data A are erased, thereby implementing secure erasing of the data A.

To effectively ensure erasing security, that is, to effectively ensure that data that needs to be erased leaves no residue and cannot be restored, when the flash memory performs an erasing operation, the flash memory may first re-write data sections of the data that need to be erased. That is, the flash memory may first find, according to storage addresses corresponding to the data sections that need to be erased, storage areas in which the data sections are stored, perform data re-writing on the areas at least once to write the data in the areas in an incorrect manner or a disordered manner, and then erase re-written data sections in the areas. Therefore, data erasing security is further improved.

It should be noted that a quantity of re-writing times may be determined according to importance of a data section that is instructed to be erased. For example, a security level may be set for a data section. A more important data section has a higher secure level, and the data section needs to be re-written for more times when data is erased. As for how to set security levels and divide data sections into security levels of a data section and how to specify a correspondence between a security level of a data section and a quantity of re-writing times, no limitation is imposed in the present disclosure.

According to the data erasing method applied to a flash memory provided in the embodiment of the present disclosure, a storage address of each data section is recorded when each data section corresponding to data is written; and when erasing is performed on the data after a data erasing instruction is received, a data section that needs to be erased and that is among the written data sections is erased according to the data erasing instruction and the recorded storage address. In this way, because the storage address of each data section is recorded when each data section is written, any written data section can be found according to the storage address of each data section. Therefore, all data sections corresponding to the data can be completely erased, thereby implementing secure erasing of the data. In addition, one or several specified data sections can be erased according to a user requirement, without affecting reading and writing of other data.

Further, to effectively improve a utilization rate of storage space, in an embodiment of the present disclosure, after the data section that needs to be erased is erased in step S13, the recorded storage address of the data section that is erased may further be erased.

Optionally, to effectively improve a utilization rate of storage space, in an embodiment of the present disclosure, a data erasing method applied to a flash memory provided in the embodiment of the present disclosure may further include the following steps erasing a data section corresponding to junk data stored in the flash memory to acquire blank storage space, and erasing a historically recorded storage address of the data section corresponding to the junk data.

In the flash memory, there is some junk data that is generated due to operations of the flash memory such as reading and writing. For example, a map table is generally set in the flash memory, and if the flash memory performs a write operation, content recorded in the map table is changed, and an originally recorded part of the content is invalid and becomes junk data. According to the method provided in the embodiment of the present disclosure, when the junk data is written, a storage address of a data section corresponding to the junk data is also recorded. Therefore, to effectively improve a utilization rate of storage space, the flash memory may reclaim the junk data and erase the junk data and a storage address of the junk data periodically or upon triggering of an instruction, so as to acquire blank storage space for other use and effectively improve the utilization rate of the storage space.

Generally, a map table used to record a storage address of a latest data section corresponding to each piece of data is set in a flash memory. When the flash memory performs a write operation and re-saves a data section corresponding to a piece of data, the data section written upon the write operation becomes a latest data section corresponding to the piece of data. In this case, a storage address of the latest data section written upon the write operation this time is recorded in an entry of the map table, and a storage address of an original latest data section that is originally recorded in the map table becomes invalid.

Figure 4:
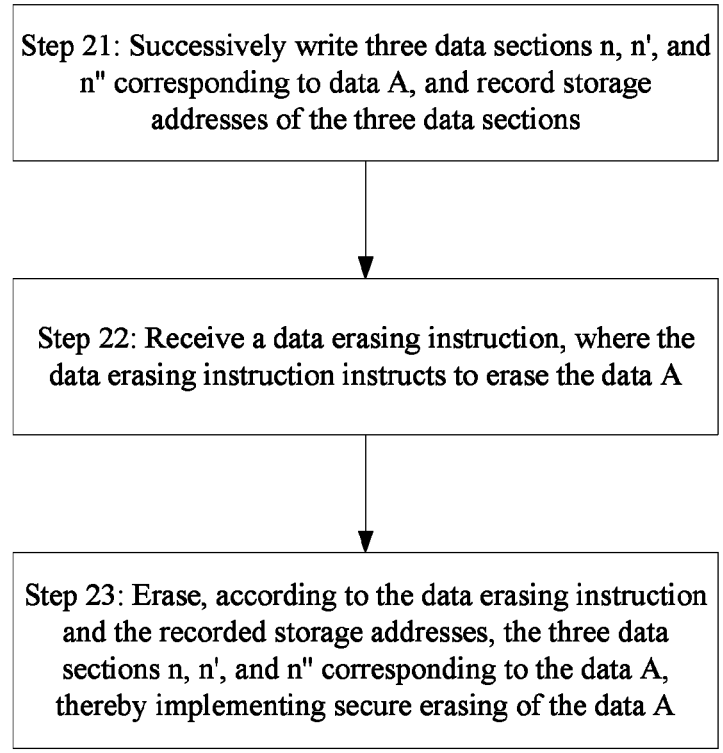
FIG. 4 is another schematic flowchart of a data erasing method according to an embodiment of the present disclosure.

In an embodiment of the present disclosure, in addition to setting a map table, an area is allocated form the flash memory and is set as a recording area, and this area is called a trace log in the present disclosure. The map table still plays a role, that is it is used to record a storage address of a latest data section corresponding to each piece of data, while the trace log is used to record a storage address of a historical data section corresponding to each piece of data. Similarly, the aforementioned data A is used as an example. As shown in FIG. 4, this embodiment includes Step 21: Successively write the three data sections n, n', and n" corresponding to the data A, and record the storage addresses of the three data sections.

The storage address of the latest data section n" that is last written is recorded in the map table, and the storage addresses of the historical data sections n and n' that are written before the latest data section n" are recorded in the trace log, where n' is written before n" and may be referred to as a second-latest data section, and n is written in the earliest and may be referred to as the original data section.

It can be understood that each time a data section is written, the written data section must be a latest data section. Therefore, in this step, when a storage address is recorded, the flash memory records a storage address of a latest data section in the map table; when a latest data section is written again, the original latest data section that is written at a previous time becomes a second-latest data section (that is, a historical data section). In this case, the flash memory may read the storage address of the second-latest data section from the map table, transfer the storage address of the second-latest data section to the trace log, that is, store the storage address of the second-latest data section in the trace log, record, in the map table, a storage address of the latest data section stored this time, and then make the storage address, of the second-latest data section, recorded in the map table become invalid.

Therefore, in this step, firstly, the flash memory writes the data section n, and records the storage address of n in the map table; then, the flash memory writes the data section n', records the storage address of n' in the map table, reads the storage address of n from the map table and stores the storage address of n in the trace log, and makes the storage address of n that is recorded in the map table become invalid; next, the flash memory writes the data section n", records the storage address of n" in the map table, reads the storage address of n' from the map table and stores the storage address of n' in the trace log, and makes the storage address of n' that is recorded in the map table become invalid.

Step 22: Receive a data erasing instruction, where the data erasing instruction instructs to erase the data A.

Step 23: Erase, according to the data erasing instruction and the recorded storage addresses, the three data sections n, n', and n" corresponding to the data A, thereby implementing secure erasing of the data A.

The flash memory reads the recorded storage address of the latest data section n" from the map table, so as to find and erase n"; the flash memory reads the recorded storage address of the second-latest data section n' from the trace log, so as to find and erase n'; and the flash memory reads the recorded storage address of the original data section n from the trace log, so as to find and erase n.

It can be understood that, if the data erasing instruction instructs to erase one or two of the three data sections of A, for example, instructs to erase n and n', the flash memory reads the recorded storage address of the second-latest data section n' and the storage address of the original data section n from the trace log, so as to find and erase n' and n.

Assuming that the data erasing instruction instructs to erase n' and n", the flash memory reads the recorded storage address of the latest data section n" from the map table, so as to find and erase n", and reads the recorded storage address of the second-latest data section n' from the trace log, so as to find and erase n'.

Further, due to limited storage space of the trace log, to ensure normal operation of the flash memory, after the data sections n, n', and n" are erased, the flash memory may erase the storage addresses, of the data sections n and n', recorded in the trace log, so as to provide the trace log with sufficient storage space.

In addition, optionally, a storage space threshold may be set for the storage space of the trace log. When free storage space of the trace log is less than the storage space threshold, that is, when the free storage space of the trace log is insufficient, the flash memory may reclaim storage space of historical data sections in a forced manner according to storage addresses, of the historical data sections, recorded in the trace log, and release storage space in which the storage addresses of the reclaimed historical data sections are recorded in the trace log.

It can be understood that storage addresses of historical data sections corresponding to multiple pieces of data are recorded in the trace log, and the historical data sections still exist in the flash memory; however, for a user, the historical data sections are data that is useless and has been overwritten. Therefore, the flash memory may reclaim all or some of the historical data sections, and release, after the historical data sections are reclaimed, storage space in which the storage addresses of the reclaimed historical data sections are recorded in the trace log, so as to ensure that the trace log has sufficient storage space.

It should be noted that, in the embodiment of the present disclosure, when the storage space in the flash memory is insufficient, data in a data block with a low utilization rate needs to be completely erased in the flash memory for reclaiming a blank data block, so as to achieve an objective of releasing the storage space of the flash memory. The data block with a low utilization rate refers to a data block in which there are a larger quantity of historical data sections and a smaller quantity of latest data sections, and for the user, the larger quantity of historical data sections and the smaller quantity of latest data sections in the data block mean that there are a larger amount of invalid data and a smaller amount of valid data in the data block; therefore, the utilization rate of the data block is low. Therefore, when the storage space in the flash memory is insufficient, a latest data section in the data block with a low utilization rate may be transferred to another data block, and then the data block with a low utilization rate becomes a block full of invalid data, that is, a full dirty block with a utilization rate of zero. In this case, all data in the data block is erased, so that the data block is reclaimed, and the storage space of the flash memory is released. In this case, a storage address, of an erased data section in the full dirty block, recorded in the trace log is meaningless; therefore, the storage address of the erased data section may be deleted from the trace log.

According to the data erasing method applied to a flash memory provided in the present disclosure, a storage address of each data section is recorded when each data section corresponding to data is written, and when erasing is performed on the data after a data erasing instruction is received, a data section that needs to be erased and that is among the written data sections is erased according to the data erasing instruction and the recorded storage address. In this way, because the storage address of each data section is recorded when each data section is written, any written data section can be found according to the storage address of each data section. Therefore, all data sections corresponding to the data can be completely erased, thereby implementing secure erasing of the data. In addition, one or several specified data sections can be erased according to a user requirement, without affecting reading and writing of other data.

Figure 5:
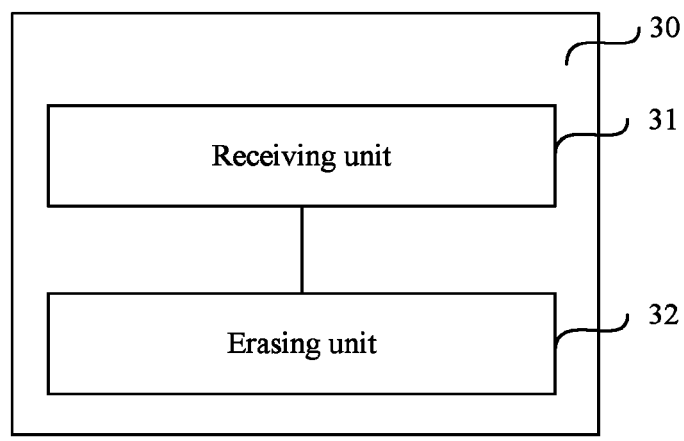
FIG. 5 is a schematic structural diagram of a data erasing apparatus according to an embodiment of the present disclosure.

Correspondingly, an embodiment of the present disclosure further provides a data erasing apparatus 30 applied to a flash memory, and as shown in FIG. 5, the apparatus 30 includes a receiving unit 31 configured to receive a data erasing instruction, where the data erasing instruction instructs to erase data or at least one data section of data sections corresponding to data, and an erasing unit 32 configured to erase, according to the data erasing instruction received by the receiving unit 31, a data section that needs to be erased and that is among the data sections corresponding to the data, where when the data erasing instruction instructs to erase the data, recorded storage addresses of all the data sections corresponding to the data are searched for and all the data sections corresponding to the data are erased according to the storage addresses that are found, or when the data erasing instruction instructs to erase the at least one data section of the data sections corresponding to the data, a recorded storage address of the at least one data section is searched for and the at least one data section is erased according to the storage address that is found.

According to the data erasing apparatus 30 applied to a flash memory provided in the embodiment of the present disclosure, when erasing is performed on data after a data erasing instruction is received, a recorded storage address is searched for according to the data erasing instruction, and a data section that needs to be erased and that is among data sections corresponding to the data is erased. In this way, each written data section can be found according to a storage address of the data section, and therefore all the data sections corresponding to the data can be completely erased, thereby implementing secure erasing of the data. In addition, one or several specified data sections can be erased according to a user requirement, without affecting reading and writing of other data except the data that needs to be erased.

The embodiment of the present disclosure may be used to execute the foregoing method embodiments. For details, reference is made to the descriptions of the method embodiments.

Figure 6:
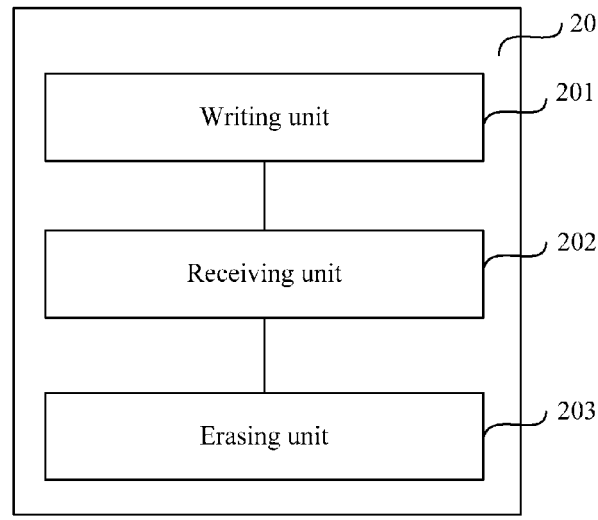
FIG. 6 is another schematic structural diagram of a data erasing apparatus according to an embodiment of the present disclosure.

An embodiment of the present disclosure further provides a data erasing apparatus 20 applied to a flash memory, and as shown in FIG. 6, the apparatus 20 includes a writing unit 201 configured to write at least one data section corresponding to data, and record a storage address of each written data section, a receiving unit 202 configured to receive a data erasing instruction, where the data erasing instruction instructs to erase at least one data section of data sections written by the writing unit 201, and an erasing unit 203 configured to erase, according to the data erasing instruction received by the receiving unit 202 and the recorded storage address, the data section that the data erasing instruction instructs to erase.

According to the data erasing apparatus 20 applied to a flash memory provided in the embodiment of the present disclosure, an erasing unit 203 erases, according to a storage address of each data section recorded when a writing unit 201 writes each data section corresponding to data, and according to a data erasing instruction received by a receiving unit 202, a data section that needs to be erased and that is among the data sections written by the writing unit 201. In this way, because the storage address of each data section is recorded when each data section is written, any written data section can be found according to the storage address of each data section. Therefore, all data sections corresponding to the data can be completely erased, thereby implementing secure erasing of the data. In addition, one or several specified data sections can be erased according to a user requirement, without affecting reading and writing of other data.

Optionally, in an embodiment of the present disclosure, a storage address of each data section recorded by the writing unit 201 includes an LBA and a BN.

The erasing unit 203 is configured to determine, according to a BN in a storage address of the data section that needs to be erased, a data block in which the data section that needs to be erased is stored, and determine, according to an LBA in the storage address of the data section that needs to be erased, a page in which the data section that needs to be erased is stored; and search for and erase, according to the determined data block and page, the data section that needs to be erased.

To effectively ensure erasing security, that is, to effectively ensure that data that needs to be erased leaves no residue and cannot be restored, when the erasing unit 203 performs an erasing operation, the erasing unit 203 may first re-write data sections of the data that need to be erased. That is, the erasing unit 203 may first find, according to storage addresses corresponding to the data sections that need to be erased, storage areas in which the data sections are stored, perform at least one round of data re-writing on the areas to write the data in the areas in an incorrect manner or a disordered manner, and then erase re-written data sections in the areas. Therefore, data erasing security is further improved.

Optionally, to effectively improve a utilization rate of storage space, in an embodiment of the present disclosure, the erasing unit 203 is further configured to erase the storage addresses of the erased data sections recorded by the writing unit 201.

Further, in an embodiment of the present disclosure, the erasing unit 203 is further configured to: erase a data section corresponding to junk data stored in the flash memory to acquire blank storage space; and erase a historically recorded storage address of the data section corresponding to the junk data.

Optionally, in an embodiment of the present disclosure, the data corresponds to at least two data sections.

In this case, the writing unit 201 is configured to write the at least two data sections corresponding to the data, and record a storage address of a latest data section that corresponds to the data and that is last written and a storage address of a historical data section that is written before the latest data section.

The erasing unit 203 is configured to if the data erasing instruction instructs to erase the data, read the recorded storage address of the latest data section, and erase the latest data section according to the read storage address; and read the recorded storage address of the historical data section, and erase the historical data section according to the read storage address, or If the data erasing instruction instructs to erase one or several data sections of the data sections corresponding to the data, read the recorded storage address or storage addresses of the one or several data sections, and erase the one or several data sections according to the read storage address or storage addresses.

Optionally, in an embodiment of the present disclosure the writing unit 201 writes at least two data sections, and a map table and a trace log are set in the data erasing apparatus 20, where the map table is used to record a storage address of a latest data section corresponding to each piece of data, and the trace log is used to record a storage address of a historical data section corresponding to each piece of data.

In this case, the writing unit 201 is configured to successively write the at least two data sections corresponding to the data, record, in the map table, a storage address of a latest data section that corresponds to the data and that is last written, and record, in the trace log, a storage address of a historical data section that is written before the latest data section.

The erasing unit 203 is configured to if the data erasing instruction instructs to erase the data, read the storage address, of the latest data section, recorded in the map table, and erase the latest data section according to the read storage address; and read the storage address, of the historical data section, recorded in the trace log, and erase the historical data section according to the read storage address.

Further, in an embodiment of the present disclosure, the at least two data sections that are successively written include the latest data section and a second-latest data section written before the latest data section.

In this case, the writing unit 201 is configured to write the second-latest data section, and record a storage address of the second-latest data section in the map table, and write the latest data section, transfer the storage address, of the second-latest data section, recorded in the map table to the trace log, and record the storage address of the latest data section in the map table.

Figure 7:
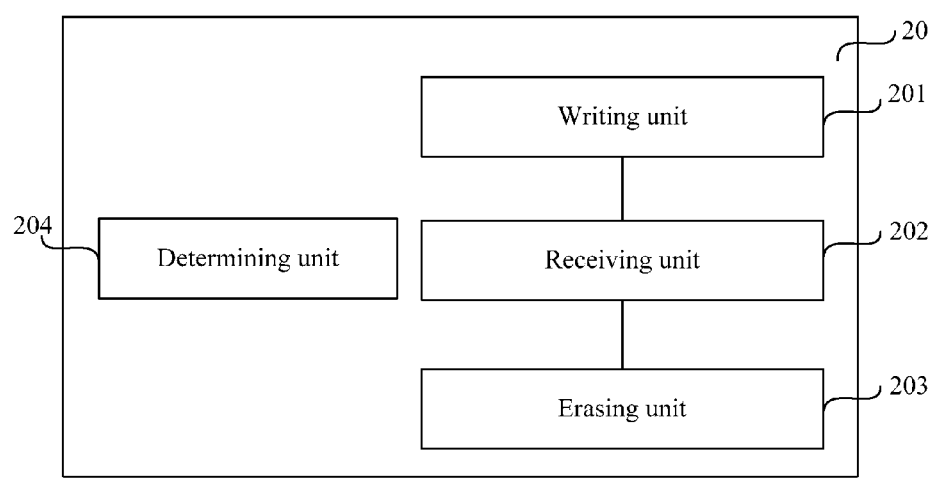
FIG. 7 is another schematic structural diagram of a data erasing apparatus according to an embodiment of the present disclosure.

Further, in an embodiment of the present disclosure, as shown in FIG. 7, the apparatus 20 further includes a determining unit 204 configured to determine whether free storage space of the trace log is less than a storage space threshold, and the erasing unit 203 is further configured to: if the determining unit 204 determines that the free storage space of the trace log is less than the storage space threshold, reclaim storage space of the historical data section in a forced manner according to the storage address, of the historical data section, recorded in the trace log, and release storage space in which the storage address of the reclaimed historical data section is recorded in the trace log.

It should be noted that, for a specific function of each structural unit of the data erasing apparatus 20 provided in the embodiment of the present disclosure, reference is made to the foregoing method embodiments.

Figure 8:
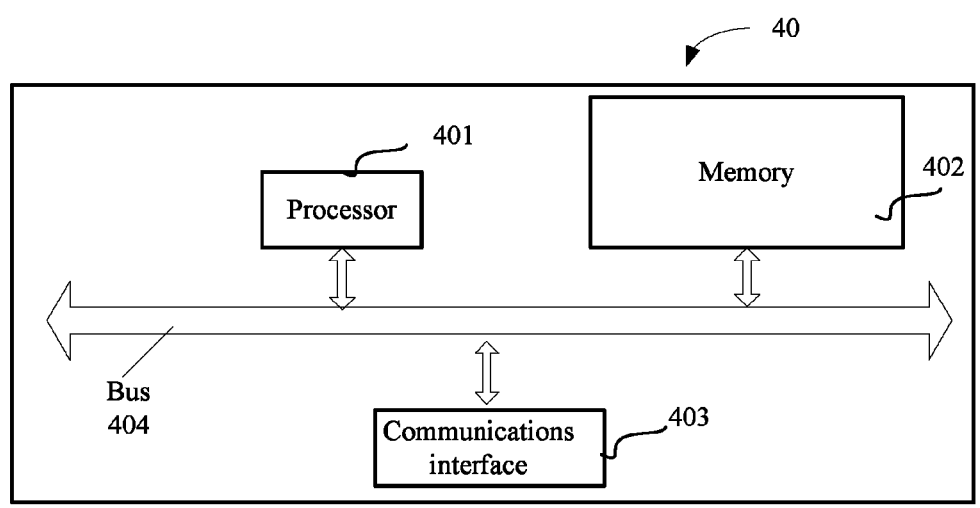
FIG. 8 is another schematic structural diagram of a data erasing apparatus according to an embodiment of the present disclosure.

FIG. 8 shows another embodiment of a data erasing apparatus according to the present disclosure. As shown in FIG. 8, a data erasing apparatus 40 provided in this embodiment includes a processor 401, a memory 402, a communications interface 403, and a bus 404. The processor 401, the memory 402, and the communications interface 403 are connected to and communicate with each other by using the bus 404. The bus 404 may be an industry standard architecture (ISA) bus, a peripheral component interconnect (PCI) bus, an extended industry standard architecture (EISA) bus, or the like. The bus 404 may be divided into an address bus, a data bus, a control bus, and the like. For ease of representation, the bus in FIG. 8 is represented by using only one thick line, but it does not mean that there is only one bus or only one type of bus.

The memory 402 is configured to store executable program code, where the program code includes a computer operation instruction. The memory 402 may include a high-speed random access memory (RAM), or may further include a non-volatile memory, for example, at least one magnetic disk memory.

The processor 401 runs, by reading the executable program code stored in the memory 402, a program corresponding to the executable program code, so as to receive a data erasing instruction, where the data erasing instruction instructs to erase data or at least one data section of data sections corresponding to data, and erase, according to the data erasing instruction, a data section that needs to be erased and that is among the data sections corresponding to the data, where when the data erasing instruction instructs to erase the data, recorded storage addresses of all the data sections corresponding to the data are searched for and all the data sections corresponding to the data are erased according to the storage addresses that are found, or when the data erasing instruction instructs to erase the at least one data section of the data sections corresponding to the data, a recorded storage address of the at least one data section is searched for and the at least one data section is erased according to the storage address that is found.

In an embodiment of the present disclosure, the processor 401 is configured to write data sections corresponding to data, where the data corresponds to at least one data section, and record a storage address of each written data section, receive a data erasing instruction, where the data erasing instruction instructs to erase the data or the at least one data section of data sections corresponding to the data, and according to the data erasing instruction and the recorded storage address, erase a data section that needs to be erased and that is among the written data sections.

According to the data erasing apparatus applied to a flash memory provided in the embodiment of the present disclosure, a processor 401 erases, according to a storage address of each written data section recorded when data is written, and according to a received data erasing instruction, a data section that needs to be erased and that is among the written data sections, that is, a data section that the data erasing instruction instructs to erase. In this way, any written data section can be found according to the storage address of each data section. Therefore, all the data sections corresponding to the data can be completely erased, thereby implementing secure erasing of the data. That is, the data erasing apparatus 40 can not only implement secure erasing of data but also erase a specified data section according to a user requirement, without affecting reading and writing of other data after the specified data is erased.

Optionally, in an embodiment of the present disclosure, a storage address, of each data section, recorded by the processor 401 includes a logical block address, LBA, and a data BN.

The processor is configured to determine, according to a BN in a storage address of the data section that needs to be erased, a data block in which the data section that needs to be erased is stored, and determine, according to an LBA in the storage address of the data section that needs to be erased, a page in which the data section that needs to be erased is stored, and search for and erase, according to the determined data block and page, the data section that needs to be erased.

Optionally, in an embodiment of the present disclosure, the processor 401 is further configured to erase the recorded storage address of the erased data section.

Optionally, in an embodiment of the present disclosure, the processor 401 is further configured to re-write the data section that needs to be erased and that is among the written data sections, and erase a re-written data section.

Optionally, to effectively improve a utilization rate of storage space, in an embodiment of the present disclosure, the processor 401 is further configured to erase a data section corresponding to junk data stored in the flash memory to acquire blank storage space; and erase a historically recorded storage address of the data section corresponding to the junk data.

Optionally, in an embodiment of the present disclosure, the data corresponds to at least two data sections.

The processor 401 is configured to write the at least two data sections corresponding to the data, and record a storage address of a latest data section that corresponds to the data and that is last written and a storage address of a historical data section that is written before the latest data section.

In this case, the processor 401 is configured to if the data erasing instruction instructs to erase the data, read the recorded storage address of the latest data section, and erase the latest data section according to the read storage address; and read the recorded storage address of the historical data section, and erase the historical data section according to the read storage address, or if the data erasing instruction instructs to erase one or several data sections of the data sections corresponding to the data, read the recorded storage address or storage addresses of the one or several data sections, and erase the one or several data sections according to the read storage address or storage addresses.

Optionally, in an embodiment of the present disclosure, each piece of data corresponds to at least two data sections;

a map table and a trace log are set in the data erasing apparatus 40. The map table is used to record a storage address of a latest data section corresponding to each piece of data, and the trace log is used to record a storage address of a historical data section corresponding to each piece of data.

In this case, the processor 401 is configured to successively write the at least two data sections corresponding to the data, record, in the map table, a storage address of a latest data section that corresponds to the data and that is last written, and record, in the trace log, a storage address of a historical data section that is written before the latest data section.

When performing an erasing operation, the processor 401 is configured to if the data erasing instruction instructs to erase the data, read the storage address, of the latest data section, recorded in the map table, and erase the latest data section according to the read storage address; and read the storage address, of the historical data section, recorded in the trace log, and erase the historical data section according to the read storage address.

Further, in an embodiment of the present disclosure, the at least two data sections that are successively written include the latest data section and a second-latest data section written before the latest data section.

In this case, the processor 401 is configured to write the second-latest data section, and record a storage address of the second-latest data section in the map table, and write the latest data section, transfer the storage address, of the second-latest data section, recorded in the map table to the trace log, and record the storage address of the latest data section in the map table.

Optionally, in an embodiment of the present disclosure, the processor 401 is further configured to: determine whether free storage space of the trace log is less than a storage space threshold; and if it is determined that the free storage space of the trace log is less than the storage space threshold, reclaim storage space of the historical data section in a forced manner according to the storage address, of the historical data section, recorded in the trace log, and release storage space in which the storage address of the reclaimed historical data section is recorded in the trace log.

The processor 401 may be a central processing unit (CPU) or an application-specific integrated circuit (ASIC), or may be configured as one or more integrated circuits that implement the embodiment of the present disclosure.

It should be noted that, in addition to the foregoing functions, the foregoing processor 401 may further be configured to execute other processes in the foregoing method embodiments, and details are not repeatedly described herein.

It should further be noted that, for division of functional units in the processor 401, reference may be made to the foregoing embodiments of the data erasing apparatus, and details are not repeatedly described herein.

Correspondingly, an embodiment of the present disclosure further provides a flash memory, where a data erasing apparatus is disposed in the flash memory, and the data erasing apparatus may be any data erasing apparatus provided in the foregoing embodiments, which is not repeatedly described herein.

According to the flash memory provided in the embodiment of the present disclosure, a data section that needs to be erased and that is among written data sections can be erased according to a storage address, of each written data section, recorded when data is written, and according to a received data erasing instruction. In this way, any written data section can be found according to the storage address of each data section. Therefore, all the data sections corresponding to the data can be completely erased, thereby implementing secure erasing of the data. That is, the flash memory not only implements secure erasing of data but also can erase a specified data section according to a user requirement, without affecting reading and writing of other data after the specified data is erased.

Optionally, in an embodiment of the present disclosure, the flash memory may be any one flash memory of the following, but is not limited to the following a solid state drive, a SM card, a CF card, a MMC, a SD card, a memory stick, an XD card, and a microdrive.

It should be noted that the data erasing method applied to a flash memory, the data erasing apparatus applied to a flash memory, and the flash memory that are provided in the embodiments of the present disclosure may be widely applied to NAND Flash control in the field of storage, and in particular, to an solid state disk (SSD) system of the NAND Flash, which is not limited in the present disclosure.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present disclosure, connection relationships between modules indicate that the modules have communication connections with each other, which may be implemented as one or more communications buses or signal cables. Persons of ordinary skill in the art may understand and implement the embodiments of the present disclosure without creative efforts.

Based on the description of the foregoing implementation manners, persons skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the may be implemented in a form of a software product. The software product is stored in a readable storage medium, such as a floppy disk, a universal serial bus (USB) flash drive, a removable hard disk, a read-only memory (ROM), a RAM, a magnetic disk, or an optical disc of a computer, and includes several instructions for instructing a computer device (which may be a personal computer, a server, a network device, and the like) to perform the methods described in the embodiments of the present disclosure.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A data erasing method applied to a flash memory, comprising:
receiving a data erasing instruction, wherein the data erasing instruction includes a logical block address corresponding to latest version data stored in a latest data section and to historical version data stored in a historical data section, wherein the latest version data is obtained by modifying one of one or more historical version data including the historical data section;
searching in a mapping table for a physical storage address of the latest data section based on the logical block address;
searching in a trace log for a physical storage address of the historical data section based on the logical block address; and
erasing all data in the latest data section identified by the physical storage address of the latest data section and in the historical data section identified by the physical storage address of the historical data section.

2. The method according to claim 1, further comprising:
storing the historical version data to the physical storage address of the historical data section;
recording the physical storage address of the historical data section in the mapping table;
storing the latest version data to the physical storage address of the latest data section;
transferring the physical storage address of the historical data section recorded in the mapping table to the trace log; and
recording the physical storage address of the latest data section in the mapping table.

3. The method according to claim 1, wherein the step of erasing comprises:
re-writing data to the physical storage address of the latest data section and the physical storage address of the historical data section; and
erasing the re-written data in the physical storage address of the latest data section and the physical storage address of the historical data section.

4. The method according to claim 1, further comprising:
erasing a junk data section corresponding to junk data stored in the flash memory to acquire blank storage space.

5. A data erasing apparatus applied to a flash memory, comprising:
an interface; and
at least one processor coupled to the interface;
wherein the interface is configured to receive a data erasing instruction, wherein the data erasing instruction includes a logical block address corresponding to latest version data stored in a latest data section and historical version data stored in a historical data section, wherein the latest version data is obtained by modifying one of one or more historical version data including the historical data section;
the at least one processor is configured to:
search in a mapping table for a physical storage address of the latest data section based on the logical block address;
search in a trace log for a physical storage address of the historical data section based on the logical block address; and
erase all data in the latest data section identified by the physical storage address of the latest data section and in the historical data section identified by the physical storage address of the historical data section.

6. The apparatus according to claim 5, wherein the at least one processor is further configured to:
store the historical version data to the physical storage address of the historical data section;
record the physical storage address of the historical data section in the mapping table;
store the latest version data to the physical storage address of the latest data section;
transfer the physical storage address of the historical data section recorded in the mapping table to the trace log; and
record the physical storage address of the latest data section in the mapping table.

7. The apparatus according to claim 5, wherein the at least one processor is further configured to:
rewrite data to the physical storage address of the latest data section and the physical storage address of the historical data section; and
erase the re-written data in the physical storage address of the latest data section and the physical storage address of the historical data section.

8. The apparatus according to claim 5, wherein the at least one processor is further configured to:
erase a junk data section corresponding to junk data stored in the flash memory to acquire blank storage space.

9. A data erasing method applied to a flash memory, comprising:
receiving a data erasing instruction, wherein the data erasing instruction includes a logical block address and a data section identifier, the logical block address corresponds to latest version data stored in a latest data section and historical version data stored in a historical data section, the data section identifier is used to indicate one or more of the latest data section and the historical data section, wherein the latest version data is obtained by modifying one of one or more historical version data including the historical data section;
searching in at least one of a mapping table and a trace log for a physical storage address of a data section corresponding to a section identifier based on the logical block address and the data section identifier, wherein the mapping table records a physical address of the latest data section, the trace log records a physical address of the historical data section; and
erasing all data in the data section identified by the physical storage address of the data section.

10. The method according to claim 9, further comprising:
storing the historical version data to the physical storage address of the historical data section;
recording the physical storage address of the historical data section in the mapping table;
storing the latest version data to the physical storage address of the latest data section;
transferring the physical storage address of the historical data section recorded in the mapping table to the trace log; and recording the physical storage address of the latest data section in the mapping table.

11. The method according to claim 9, wherein the step of erasing comprises:
   re-writing data to the data section identified by the physical storage address of the data section; and
   erasing the re-written data in the physical storage address of the data section.

12. The method according to claim 9, further comprising:
   erasing a junk data section corresponding to junk data stored in the flash memory to acquire blank storage space.

13. A data erasing apparatus applied to a flash memory, comprising:
   an interface; and
   at least one processor coupled to the interface;
   wherein the interface is configured to receive a data erasing instruction, wherein the data erasing instruction includes a logical block address and a data section identifier, the logical block address corresponds to latest version data stored in a latest data section and historical version data stored in a historical data section, the data section identifier is used to indicate one or more of the latest data section and the historical data section, wherein the latest version data is obtained by modifying one of one or more historical version data including the historical data section;
   the at least one processor is configured to:
      search in at least one of a mapping table and a trace log for a physical storage address of a data section corresponding to a section identifier based on the logical block address and the data section identifier, wherein the mapping table records a physical address of the latest data section, the trace log records a physical address of the historical data section; and
      erase all data in the data section identified by the physical storage address of the data section.

14. The apparatus according to claim 13, wherein the at least one processor is further configured to:
   re-write data to the data section identified by the physical storage address of the data section; and
   erase the re-written data in the physical storage address of the data section.

15. The apparatus according to claim 13, wherein the at least one processor is further configured to:
   erase a junk data section corresponding to junk data stored in the flash memory to acquire blank storage space.

* * * * *

UNITED STATES PATENT AND TRADEMARK OFFICE
CERTIFICATE OF CORRECTION

PATENT NO. : 10,007,468 B2  
APPLICATION NO. : 15/716360  
DATED : June 26, 2018  
INVENTOR(S) : Yan Li Page 1 of 1

It is certified that error appears in the above-identified patent and that said Letters Patent is hereby corrected as shown below:

On the Title Page

Column 1 (Notice), Line 3, after "0 days." delete "days.".

Signed and Sealed this  
Third Day of March, 2020

Andrei Iancu  
*Director of the United States Patent and Trademark Office*